United States Patent
Lak et al.

[11] Patent Number: 6,164,078
[45] Date of Patent: Dec. 26, 2000

[54] CRYOGENIC LIQUID HEAT EXCHANGER SYSTEM WITH FLUID EJECTOR

[75] Inventors: Tibor I Lak, Huntington Beach; Gene Rogers, San Pedro; James F. Weber, Moorpark; Michael V. Merlin, Anaheim; Timothy L. Gaynor, III, Cypress; John E. Davis, Claremont; David L. Gerhardt, Redondo Beach, all of Calif.

[73] Assignee: Boeing North American Inc., Seal Beach, Calif.

[21] Appl. No.: 09/262,796

[22] Filed: Mar. 4, 1999

[51] Int. Cl.⁷ .................................................. F17C 5/02
[52] U.S. Cl. ........................ 62/47.1; 62/116; 62/500; 62/910
[58] Field of Search ............................ 62/47.1, 116, 500, 62/910

[56] References Cited

U.S. PATENT DOCUMENTS

| | | |
|---|---|---|
| 2,640,627 | 6/1953 | Doelter . |
| 3,091,096 | 5/1963 | Rendos et al. .............................. 62/910 |
| 3,389,555 | 6/1968 | Goldstein et al. . |
| 3,670,519 | 6/1972 | Newton ...................................... 62/116 |
| 3,800,550 | 4/1974 | Delahunty .................................. 62/47.1 |
| 4,007,776 | 2/1977 | Alkasab ...................................... 62/500 |
| 4,301,662 | 11/1981 | Whitnah ...................................... 62/500 |
| 4,625,522 | 12/1986 | Cheron et al. .............................. 62/500 |
| 4,637,216 | 1/1987 | Shenoy et al. ............................. 62/47.1 |
| 4,821,524 | 4/1989 | Kostyal et al. ............................. 62/47.1 |
| 5,315,530 | 5/1994 | Gerhardt et al. . |
| 5,398,515 | 3/1995 | Lak . |
| 5,644,920 | 7/1997 | Lak et al. . |
| 5,647,221 | 7/1997 | Garris, Jr. ................................... 62/116 |

*Primary Examiner*—Ronald Capossela
*Attorney, Agent, or Firm*—Stout, Uxa, Buyan & Mullins, LLP; Donald E. Stout

[57] ABSTRACT

A cryogenic liquid heat exchanger system has a subatmospheric pressure reservoir, a tube, and an initial fluid ejector. The sub-atmospheric pressure reservoir has a vacuum exhaust. The tube extends through the reservoir. The initial fluid ejector has a suction chamber inlet that is functionally connected to the reservoir vacuum exhaust. The system may have a plurality of fluid ejectors connected to one or more exhausts either in series or parallel. The initial fluid ejector may receive one or more pressurized fluid streams, and the streams may be steam. A process for generating sub-atmospheric pressures in a cryogenic fluid heat exchanger reservoir includes the step of discharging an initial fluid stream into an initial fluid ejector having a suction chamber functionally connected to an exhaust of the reservoir. A process for generating sub-atmospheric pressures in a cryogenic fluid heat exchanger reservoir includes the step of using a fluid ejector to reduce the pressure in the reservoir. In either process, cooling cryogenic fluid is directed through the reservoir. The cooling cryogenic fluid may be liquid nitrogen or liquid hydrogen. In either process, an incoming cryogenic fluid stream is directed through a tube that extends through the reservoir. The incoming cryogenic fluid may be liquid oxygen or liquid hydrogen, or any other suitable cryogenic fluid.

25 Claims, 1 Drawing Sheet

CRYOGENIC LIQUID HEAT EXCHANGER SYSTEM WITH FLUID EJECTOR

BACKGROUND OF THE INVENTION

1. Field of the Invention

This invention relates to cooling systems and, more specifically, to cryogenic cooling systems.

2. Description of the Related Art

Propulsion systems utilizing cryogenic liquid oxygen and/or hydrogen, such as the Space Shuttle, Atlas/Centaur, Delta, etc., are currently filled from the facility storage tanks and subsequently allowed to cool in the flight tanks in order to reject the heat absorbed by the liquid as a result of environmental heat leak, transfer line, and tank wall chilldown. The cooling of the liquid bulk is desirable in order to increase the liquid density so that more impulse mass can be stored in the tank, and also to reduce the liquid vapor pressure so that the tank operating pressure and tank weight is minimized.

The prior art discloses numerous process and systems for cooling the cryogenic liquid. The cryogenic liquid may be cooled through jackets on the tanks. However, due to weight restrictions and the problems associated with such low temperature cooling, a cryogenic liquid stream is cooled. The cryogenic liquid stream that initially charges the tank may be cooled prior to entering the tank. The cryogenic liquid in the tank is furthered cooled through reducing the temperature of a recirculation stream of cryogenic fluid.

The prior art discloses a cryogenic heat exchanger system that comprises a tube or tubes that extend through a reservoir. The cryogenic stream that is to be cooled is directed through the tubes. The reservoir is filled with another cryogenic fluid at a lower temperature. The tubes through which the cryogenic fluid stream flows are submerged in the reservoir, resulting in the cryogenic fluid stream being cooled as it moves through the tubes.

The cryogenic fluid in the heat exchanger reservoir may be at a sub-atmospheric pressure to maintain it at a lower temperature and assist in thermal transfer between it and the cryogenic fluid stream. The prior art discloses using a dedicated compressor to create the sub-atmospheric pressure and compress the vapor from the reservoir prior to discharge. This process and system directly requires the use of the compressor, which is a complex piece of equipment.

Therefore, a need exists to create a sub-atmospheric pressure in the heat exchanger reservoir system that requires simpler dedicated equipment than a compressor.

SUMMARY OF THE INVENTION

The present invention comprises a greatly improved system and method for cooling crygenic fluids in spacecraft propulsion systems and the like, which does not require heavy and complex systems such as dedicated cryogenic compressors.

More particularly, there is provided a cryogenic fluid heat exhanger system comprising a sub-atmospheric pressure reservoir having a vacuum exhaust, a first cryogenic fluid inlet and a first cryogenic fluid outlet. The reservoir is preferably filled with the first cryogenic fluid. A tube for a second cryogenic fluid extends through the sub-atmospheric pressure reservoir. An entry location is provided where the tube enters the sub-atmospheric pressure reservoir, and an exit location is provided where the tube exits the sub-atmospheric pressure reservoir. A fluid ejector is fluidly attached to the vacuum exhaust.

Both the first and second cryogenic fluid preferably comprise a liquid. The first cryogenic fluid is preferably liquid nitrogen or liquid hydrogen, and the second cryogenic fluid is preferably liquid hydrogen or liquid oxygen. If the second cryogenic fluid is liquid hydrogen, its temperature at the exit location will be less than approximately 26° R. It it is liquid oxygen, its temperature at the exit location will be less than approximately 120° R. Of course, the first cryogenic liquid is colder than the second cryogenic liquid at the exit location.

The fluid ejector comprises a fluid stream inlet nozzle for receiving a third pressurized fluid therethrough. The fluid stream inlet nozzle is disposed in a suction chamber which is fluidly connected to the vacuum exhaust. Preferably, the third pressurized fluid comprises steam. The suction chamber receives cryogenic fluid vapor from the vacuum exhaust. In operation, the third pressurized fluid and the cryogenic fluid vapor mix together in the suction chamber to form an ejector discharge stream which exists the ejector through a discharge end. The suction from the ejector flow causes the sub-atmospheric pressure of the reservoir is less than approximately 1.5 psia. Is is noted that fluid exiting from the ejector discharge end does not flow directly into the first cyrogenic fluid inlet.

In another aspect of the invention, a process for cooling a cryogenic fluid is disclosed. The inventive process uses a sub-atmospheric pressure reservoir having a vacuum exhaust, a fluid inlet and fluid outlet, a tube extending through the sub-atmospheric pressure reservoir, including an entry location where said tube enters the sub-atmospheric pressure reservoir and an exit location where the tube exits the sub-atmospheric pressure reservoir, and a fluid ejector fluidly attached to the vacuum exhaust. The inventive method comprises steps of causing a first cryogenic fluid to enter the sub-atmospheric pressure reservoir through the fluid inlet so that it fills the reservoir and exits through the fluid outlet, causing a second cryogenic fluid to flow through the tube so that it is cooled by the first cryogenic fluid, and causing a third pressurized fluid to flow through the fluid ejector.

The invention, together with additional features and advantages thereof, may best be understood by reference to the following description taken in conjunction with the accompanying illustrative drawing.

DESCRIPTION OF THE PREFERRED EMBODIMENTS

Figure 1:
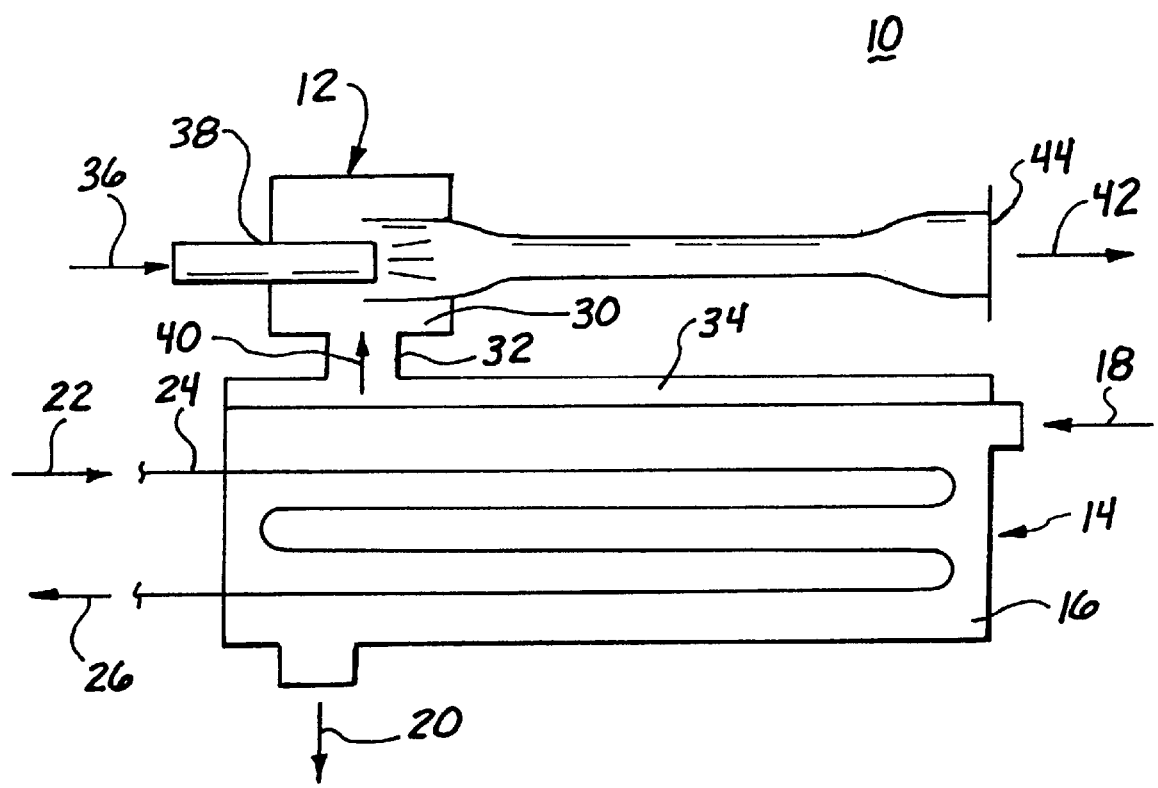
FIG. 1 schematically shows a cryogenic liquid heat exchanger system according to an embodiment of the invention.

Referring now to FIG. 1, wherein like reference numerals refer to like elements throughout the figures, a cryogenic liquid heat exchanger system 10 uses a fluid ejector 12 to create a sub-atmospheric pressure in the system's reservoir tank 14. The fluid ejector 12 has no moving parts, therefore the system 10 is simpler than the cryogenic liquid heat exchangers of the prior art that use a dedicated mechanical system to create the sub-atmospheric pressure. The fluid ejector 12 does use a pressurized fluid stream 36 which may be generated by a mechanical system with moving parts, such as a compressor, a pump, or a boiler.

The reservoir 14 is a tank that holds a cooling cryogenic fluid 16. The cryogenic fluid 16 is shown entering the reservoir 14 on the right as a reservoir inlet stream 18. The cryogenic fluid 16 is shown exiting the reservoir 14 from the bottom as a reservoir outlet stream 20.

The cryogenic liquid heat exchanger system 10 cools a cryogenic fluid stream 22. The stream 22 flows through a tube 24 that extends through the reservoir 14. The tube 24 is submerged in the cooling cryogenic fluid 16 in the reservoir 14. The cooling cryogenic fluid 16 is colder than the stream 22. The stream 22 exits the tube 24 and the reservoir 14 as a cooler cryogenic liquid stream 26. Embodiments of the invention comprise many arrangements of the reservoir 14 and the tube 24, as is known by those skilled in the art.

The reservoir 14 is kept at a sub-atmospheric pressure through the use of the fluid ejector 12. The fluid ejector 12 comprises a suction chamber 30 that is functionally connected to a vacuum vent 32 in the reservoir. The vent 32 is located at the top of the reservoir 12 such that it has access to ullage 34 in the reservoir.

To use the fluid ejector 12 to generate the sub-atmospheric pressure, the pressurized fluid stream 36 is directed into a fluid stream inlet nozzle 38 of the ejector 12. As the stream 36 flows through the fluid ejector 12, vapor 40 is drawn up from the ullage 34, through the vacuum vent 32 and into the ejector suction chamber 30, resulting in sub-atmospheric pressure created in the reservoir 14. The vapor 40 mixes with the high pressure fluid stream 36 to form an ejector discharge stream 42 that exits the ejector through a discharge end 44 of the fluid ejector 12. The discharge end 44 is distally located from the fluid stream inlet nozzle 38.

Embodiments of the invention may have many different variations on the use of fluid ejectors. A fluid ejector may use any suitable pressurized fluid stream to operate, the fluid being a gas or a liquid. The fluid ejector 12 and the pressurized fluid flow 36 are designed to prevent localized freezing in the ejector. In an embodiment of the invention, a steam flow is the pressurized fluid stream. In an embodiment of the invention, a fluid ejector may have multiple inlet nozzles. In an embodiment of the invention, the suction chambers of multiple fluid ejectors may be functionally connected to one or more reservoir vents. In an embodiment of the invention, a plurality of fluid ejectors may be functionally connected either serially or in parallel. Other embodiments of the invention may have other fluid ejector arrangements, such as those skilled in the art are able to design that result in the desired and predetermined sub-atmospheric pressure in the reservoir 14.

In a preferred embodiment of the invention, the sub-atmospheric pressure in the reservoir is less than 1.5 psia. Embodiments of the invention use any suitable combination of cryogenic fluids as the cooling cryogenic fluid 16 and the cryogenic fluid stream 22. Examples of the cooling cryogenic fluids include liquid nitrogen or liquid hydrogen. Examples of cryogenic fluid streams include liquid oxygen and liquid hydrogen. In a further embodiment of the invention, the cryogenic liquid heat exchanger system 10 cools the liquid oxygen or the liquid hydrogen of the incoming cryogenic fluid stream 22 to less than 120° R and 26° R, respectively.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A cryogenic fluid heat exchanger system comprising:
   a sub-atmospheric pressure reservoir having a vacuum exhaust, a first cryogenic fluid inlet and a first cryogenic fluid outlet;
   a tube for a second cryogenic fluid extending through said sub-atmospheric pressure reservoir;
   an entry location where said tube enters said sub-atmospheric pressure reservoir;
   an exit location where said tube exits said sub-atmospheric pressure reservoir; and
   a fluid ejector fluidly attached to said vacuum exhaust.

2. The cryogenic fluid heat exchanger system as recited in claim 1, wherein said first cryogenic fluid comprises a liquid.

3. The cryogenic fluid heat exchanger system as recited in claim 1, wherein said second cryogenic fluid comprises a liquid.

4. The cryogenic fluid heat exchanger system as recited in claim 1, said fluid ejector comprising a fluid stream inlet nozzle for receiving a third pressurized fluid therethrough, said fluid stream inlet nozzle being disposed in a suction chamber which is fluidly connected to said vacuum exhaust.

5. The cryogenic fluid heat exchanger system as recited in claim 4, wherein said third pressurized fluid comprises steam.

6. The cryogenic fluid heat exchanger system as recited in claim 4, wherein said suction chamber receives cryogenic fluid vapor from said vacuum exhaust.

7. The cryogenic fluid heat exchanger as recited in claim 6, wherein said third pressurized fluid and said cryogenic fluid vapor mix together in said suction chamber to form an ejector discharge stream which exits said ejector through a discharge end.

8. The cryogenic fluid heat exchanger as recited in claim 7, wherein fluid exiting from said ejector discharge end does not flow directly into said first cryogenic fluid inlet.

9. The cryogenic fluid heat exchanger as recited in claim 1, wherein said reservoir is filled with said first cryogenic fluid, wherein said first cryogenic fluid surrounds said tube.

10. The cryogenic fluid heat exchanger as recited in claim 9, wherein the temperature of said second cryogenic fluid at said exit location is less than 120° R.

11. The cryogenic fluid heat exchanger as recited in claim 10, wherein said second cryogenic fluid is liquid oxygen.

12. The cryogenic fluid heat exchanger as recited in claim 9, wherein said second cryogenic fluid is liquid hydrogen.

13. The cryogenic fluid heat exchanger as recited in claim 9, wherein the temperature of said second cryogenic fluid at said exit location is less than approximately 26° R.

14. The cryogenic fluid heat exchanger as recited in claim 1, wherein the sub-atmospheric pressure of said reservoir is less than approximately 1.5 psia.

15. The cryogenic fluid heat exchanger as recited in claim 1, wherein said first cryogenic fluid comprises liquid nitrogen.

16. The cryogenic fluid heat exchanger as recited in claim 1, wherein said first cryogenic fluid comprises liquid hydrogen.

17. The cryogenic fluid heat exchanger as recited in claim 1, wherein said first cryogenic fluid is colder than said second cryogenic fluid at said exit location.

18. A process for cooling a cryogenic fluid using a sub-atmospheric pressure reservoir having a vacuum exhaust, a fluid inlet and a fluid outlet, a tube extending through said sub-atmospheric pressure reservoir, including an entry location where said tube enters said sub-atmospheric pressure reservoir and an exit location where said tube exits said sub-atmospheric pressure reservoir, and a fluid ejector fluidly attached to said vacuum exhaust, said method comprising steps of:

a) causing a first cryogenic fluid to enter said sub-atmospheric pressure reservoir through said fluid inlet so that it fills said reservoir and exits through said fluid outlet;

b) causing a second cryogenic fluid to flow through said tube so that it is cooled by said first cryogenic fluid; and c) causing a third pressurized fluid to flow through said fluid ejector.

19. The process as recited in claim 18, wherein said first cryogenic fluid comprises a liquid.

20. The process as recited in claim 18, wherein said second cryogenic fluid comprises a liquid.

21. The process as recited in claim 18, wherein said third pressurized fluid comprises steam.

22. The cryogenic fluid heat exchanger system as recited in claim 18, wherein said fluid ejector receives cryogenic fluid vapor from said vacuum exhaust.

23. The cryogenic fluid heat exchanger as recited in claim 18, wherein the temperature of said second cryogenic fluid at said exit location is less than 120° R.

24. The cryogenic fluid heat exchanger as recited in claim 18, wherein the sub-atmospheric pressure of said reservoir is less than approximately 1.5 psia.

25. The cryogenic fluid heat exchanger as recited in claim 18, wherein fluid exiting from said fluid ejector does not flow directly into said first cryogenic fluid inlet.

* * * * *